No. 641,200. Patented Jan. 9, 1900.
A. FERRI.
CYLINDER FOR THRESHING MACHINES.
(Application filed Nov. 16, 1896.)
(No Model.)
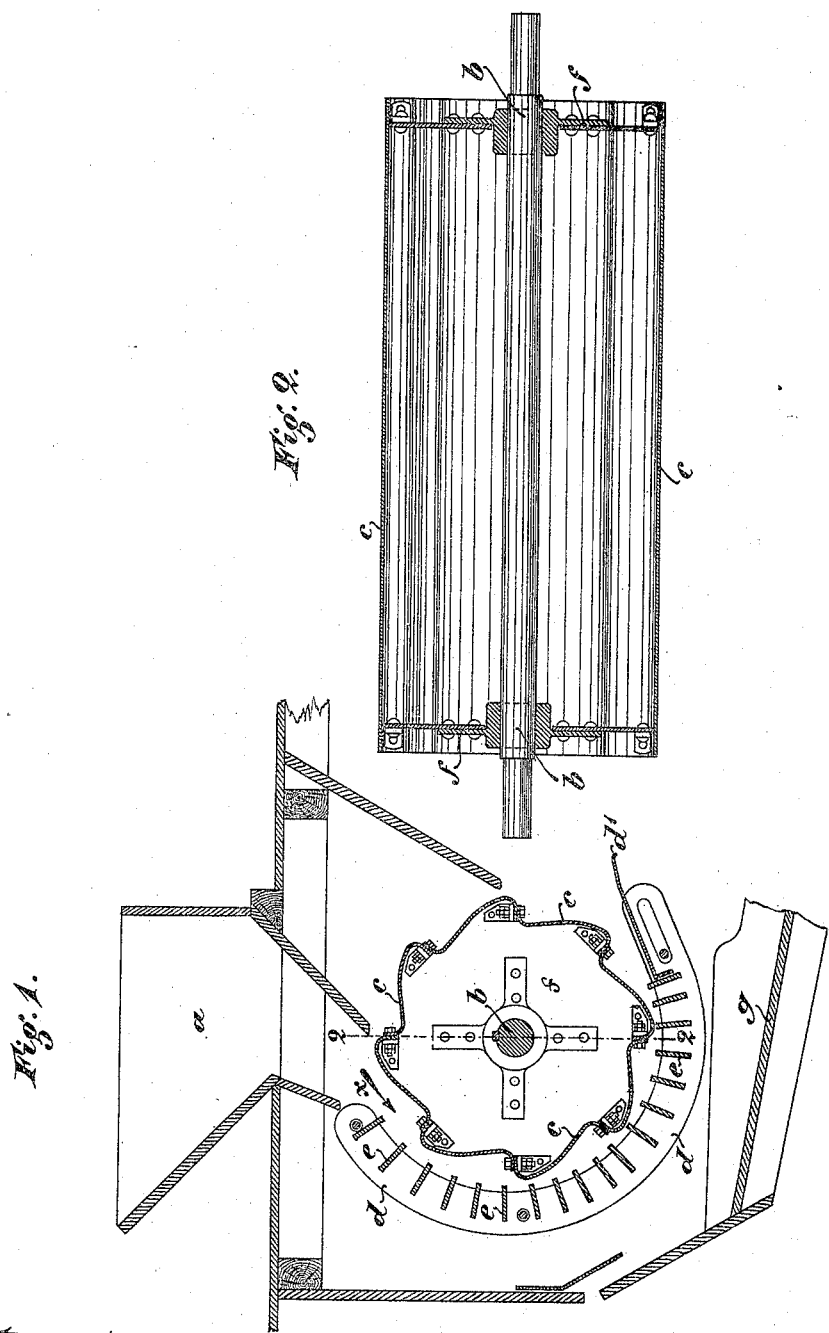

UNITED STATES PATENT OFFICE.

ANIBAL FERRI, OF CALARASI, ROUMANIA, ASSIGNOR TO EUGEN BEHLES, OF BUCHAREST, ROUMANIA.

CYLINDER FOR THRESHING-MACHINES.

SPECIFICATION forming part of Letters Patent No. 641,200, dated January 9, 1900.

Application filed November 16, 1896. Serial No. 612,319. (No model.)

*To all whom it may concern:*

Be it known that I, ANIBAL FERRI, a subject of the King of Italy, residing at Calarasi, in the Kingdom of Roumania, have invented a new and useful Improved Cylinder for Threshing-Machines, (for which I have obtained patents in Austria, No. 1,617, bearing date April 26, 1896; in Germany, No. 88,886, bearing date February 12, 1896; in Great Britain, No. 6,777, bearing date May 27, 1895; in Russia, No. 962, bearing date July 25, 1898, and in Hungary, No. 6,205, bearing date February 29, 1896,) of which the following is a specification.

The object of this invention is to enable the agriculturist or farmer to dispense with the expensive plant which hitherto he has had to provide in addition to the threshing-machine for the purpose of shelling or removing the grain from the spikes or ears of Indian corn or maize. In order to attain this end, there is, according to this invention, substituted for the ordinary cylinder of the threshing-machine a special drum, which converts such threshing-machine into a maize-grain-removing or corn-shelling machine. The quantity of maize grain which under the action of the improved maize-drum undergoes a double purifying process in the threshing-machine is at least equal to that which is yielded by the old maize-threshing apparatus in the same time, while an additional advantage of the novel arrangement is that it enables spikes or ears of Indian corn to be shelled or stripped of their grains whether or not they are still enveloped in their husks, leaves, or "spathes." The periphery of the casing of the drum is provided with longitudinal cam-shaped ribs or rounded projections providing longitudinal grooves each having one steeply-inclined front wall and one gradually-inclined rearwardly-extending wall, whereby the spikes or ears of maize received in these grooves are as the drum rotates compressed between the walls of the grooves and the bars of the segmental threshing cage or concave, the grains being detached as the spikes or ears are thus acted upon. The grain thus loosened drops between the bars of the threshing cage or concave and is intercepted by the sifting-surface or bottom frame of the threshing-machine, while the spikes or cobs freed from their grain traverse the threshing cylinder or concave from the feed to the discharge side.

The invention is illustrated in the accompanying drawings, in which—

Figure 1 is a cross-section of a part of an ordinary threshing-machine containing the drum for removing the grain from the spikes or ears of Indian corn or maize; and Fig. 2 is a longitudinal axial section of the drum only, taken on the line 2 2 in Fig. 1.

*a* represents the hopper of the threshing-machine.

*b* is the shaft of the inserted drum, the continuous casing *c* of which is connected with the said shaft by means of the end disks *f f* and the spider-frame having a hub.

*d* is the threshing cage or concave, provided with the bars *e*. Under the threshing-cage is arranged a sifting-surface or bottom frame *g*.

The periphery of the casing *c* of the drum is provided with longitudinal cam-shaped ribs or rounded projections providing longitudinal grooves presenting one steeply-inclined front wall and one gradually-inclined rearwardly-extending wall, whereby the spikes or ears of maize received in these grooves are when the drum is rotated in the direction of the arrow *x* in Fig. 1 compressed between the walls of the grooves and the bars *e* of the segmental threshing cage or concave *d*, the grains being detached as the spikes or ears are thus acted upon. The grain thus loosened drops between the bars *e* of the threshing cage or concave *d* and is intercepted by the sifting-surface or bottom frame *g*, arranged below, while the spikes or cobs traverse the threshing-cage *d* and are delivered at *d'* in cleaned condition.

Having thus described my invention, the following is what I claim as new therein and desire to secure by Letters Patent:

1. A drum for removing the grain from the spikes or ears of Indian corn or maize comprising a continuous closed casing formed with longitudinal cam-shaped ribs or rounded projections providing longitudinal grooves, each groove having one front steeply-inclined wall and one gradually-inclined rearwardly-extending wall; substantially as described.

2. The combination, with the concave of an ordinary threshing-machine; of a drum for removing the grain from the spikes or ears of Indian corn or maize, comprising a continuous closed casing formed with longitudinal cam-shaped ribs or rounded projections providing longitudinal grooves each having one front steeply-inclined wall and one gradually-inclined rearwardly-extending wall; substantially as described.

In testimony whereof I have hereunto set my hand in the presence of two subscribing witnesses.

ANIBAL FERRI.

Witnesses:
A. L. JOSEPH,
ALOIS L. WEIL.